(12) United States Patent
Kulkarni

(10) Patent No.: US 10,795,870 B1
(45) Date of Patent: Oct. 6, 2020

(54) SCHEMA BASED VALIDATION OF EXTRA FIELDS IN A DATA FILE

(71) Applicant: Capital One Services, LLC, McLean, VA (US)

(72) Inventor: Kirankumar Kulkarni, Mckinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/658,978

(22) Filed: Oct. 21, 2019

(51) Int. Cl.
  *G06F 16/215* (2019.01)
  *G06F 16/21* (2019.01)
  *G06F 16/81* (2019.01)
  *G06F 16/22* (2019.01)
  *G06F 16/25* (2019.01)

(52) U.S. Cl.
  CPC .......... *G06F 16/215* (2019.01); *G06F 16/211* (2019.01); *G06F 16/2219* (2019.01); *G06F 16/258* (2019.01); *G06F 16/81* (2019.01)

(58) Field of Classification Search
  None
  See application file for complete search history.

(56) References Cited

U.S. PATENT DOCUMENTS

| | | | |
|---|---|---|---|
| 7,246,351 B2* | 7/2007 | Bloch et al. | |
| 8,826,443 B1* | 9/2014 | Raman et al. | |
| 9,928,379 B1* | 3/2018 | Hoffer | |
| 2015/0026027 A1* | 1/2015 | Priess et al. | |
| 2015/0213288 A1* | 7/2015 | Bilodeau et al. | |

* cited by examiner

*Primary Examiner* — Wilson Lee

(57) ABSTRACT

The disclosure is directed to systems to validate fields of a data file. A data file comprising name-value pairs can be validated. Allowed ones of the name-value pairs can be identified. A redacted data file comprising indications of the identified allowed ones of the name-value pairs but not ones of the name-value pairs not identified as allowed can be generated. The redacted data file can be sent to a data storage device.

9 Claims, 7 Drawing Sheets

SCHEMA BASED VALIDATION OF EXTRA FIELDS IN A DATA FILE

BACKGROUND

Modern database systems are often equipped to store data files, such as, for example Java Script Object Notation (JSON) data files. However, many such data files often include fields that are not needed for long term storage or archival purposes. Furthermore, there is often no limit of the number of fields that can be inserted into such data files. Accordingly, storing such data files "as-is" can quickly increase the size of the data stored in a database.

DETAILED DESCRIPTION

Figure 1:
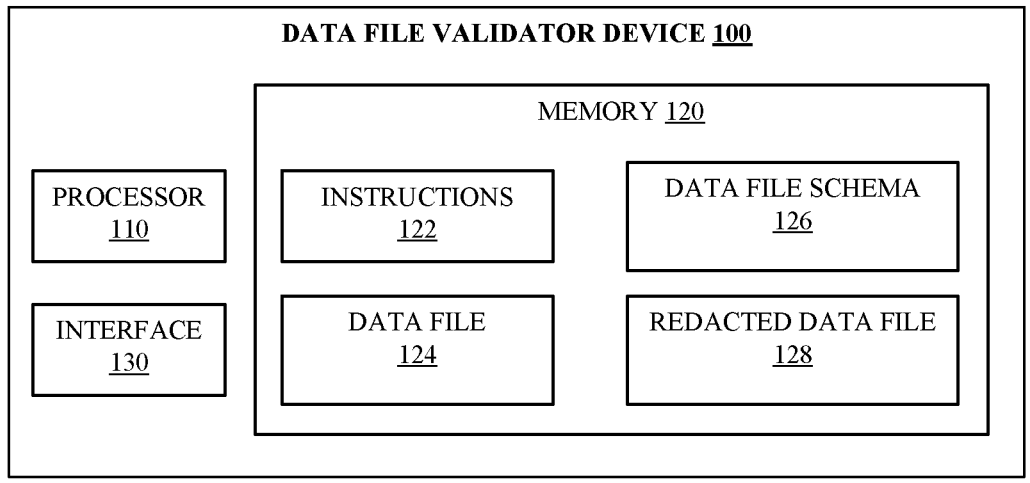
FIG. 1 illustrates a data file validator device.

Embodiments disclosed herein provide a system in which fields in a data file are validated. It is important to note, that the present disclosure provides to validate fields in a data file and to remove any of these fields deemed "extra" or not allowed. As a specific example, the present disclosure can be provided to validate extra fields in a JSON data file. A computing device comprising a processor and memory including instructions executable by the processor can be provided. The computing device (or the processor in executing the instructions) can be arranged to receive a schema comprising an indication of fields within the JSON data file that are allowed. The computing device can generate a redacted data file comprising only these allowed fields. That is, the computing device can generate a redacted data file by removing fields not designated as allowed from the JSON data file.

Furthermore, the present disclosure can be provided to both generate the redacted data file and to validate a subset of the allowed fields for content. For example, unallowed fields can be redacted while ones of the allowed fields can be validated to ensure that they conform to mandated (or preferred) formats.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with logical operations. Useful machines for performing these logical operations may include general purpose digital computers as selectively activated or configured by a computer program that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates a data file validator device 100. The data file validator device 100 is representative of any number and type of devices, arranged to ingest a data file and validate the data file as provided herein. For example, data file validator device 100 may be a server, a cloud hosted computing device, or the like. As shown, the data file validator device 100 includes a processor 100, memory 120, and an interface 130.

The processor 110 may include circuitry or processor logic, such as, for example, any of a variety of commercial processors. In some examples, the processor 110 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor 110 may include graphics processing portions and may include dedicated memory, multiple-threaded processing and/or some other parallel processing capability. In some examples, the processor 110 may be an application specific integrated circuit (ASIC) or a field programmable integrated circuit (FPGA).

The memory 120 may include logic, a portion of which includes arrays of integrated circuits, forming non-volatile memory to persistently store data or a combination of non-volatile memory and volatile memory. It is to be appreciated, that the memory 120 may be based on any of a variety of technologies. In particular, the arrays of integrated circuits included in memory 120 may be arranged to form one or more types of memory, such as, for example, dynamic random access memory (DRAM), NAND memory, NOR memory, or the like.

Interface 130 may include logic and/or features to support a communication interface. For example, the interface 130 may include one or more interfaces that operate according to various communication protocols or standards to communicate over direct or network communication links. Direct communications may occur via use of communication protocols or standards described in one or more industry standards (including progenies and variants). For example, the interface 140 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, interface 130 may be arranged to support wireless communication protocols or standards, such as, for example, Wi-Fi, Bluetooth, ZigBee, LTE, 5G, or the like.

Memory 120 stores instructions 122, data file 124, data file schema 126, and redacted data file 128. Processor 110, in executing instructions 122, can receive (e.g., via interface 130, or the like) data file 124 and data file schema 126. Additionally, in executing instructions 122, processor 110 can generate redacted data file 128 based on validating data file 124 using data file schema 126. This will be described in greater detail below, for example, with reference to FIGS. 2-4.

Figure 2:
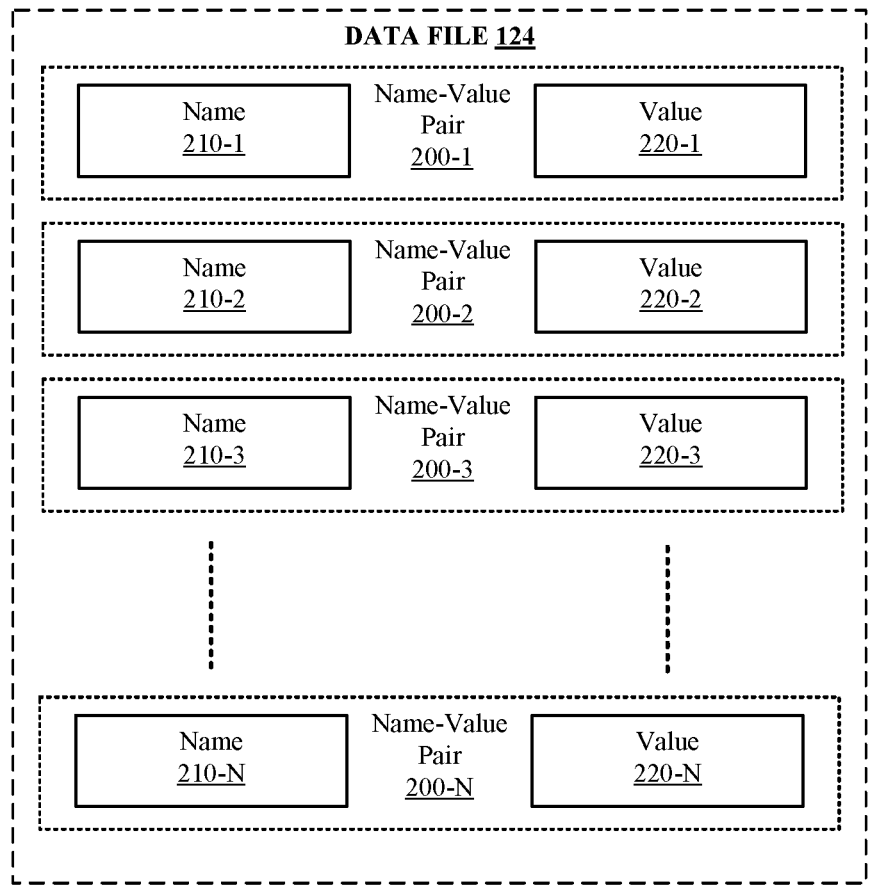
FIG. 2 illustrates a data file.
Figure 3:
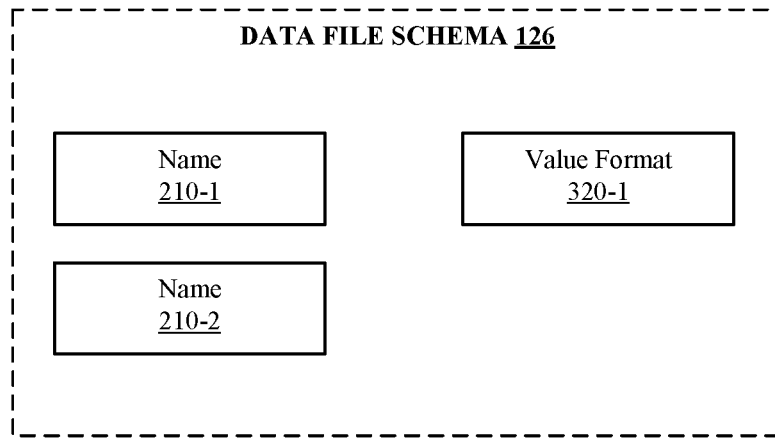
FIG. 3 illustrates a data file schema.
Figure 4:
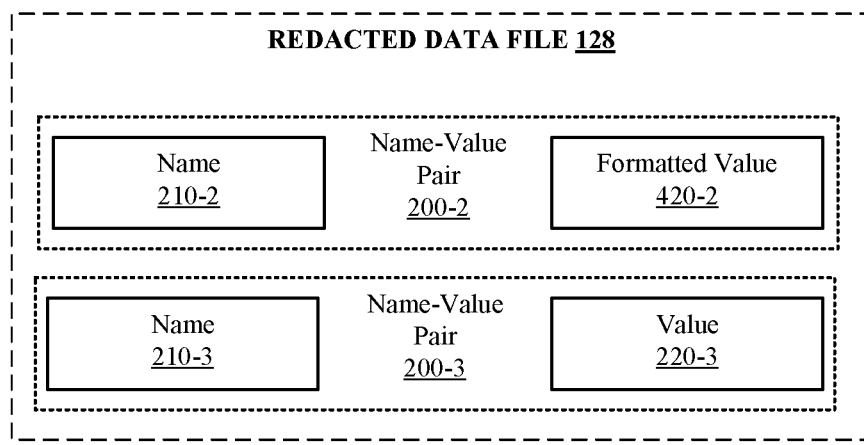
FIG. 4 illustrates a redacted data file.

FIGS. 2-4 illustrate an example data files 124, data file schema 126, and redacted data file 128, respectively. Turning to FIG. 2, data file 124 includes a number of name-value pairs 200. Each name-value pair 200 includes a name 210 and an associated value 220. For example, FIG. 2 illustrates data file 124 including name-value pairs 200-1, 200-2, 200-3, to 200-$n$, where n is a positive integer. As noted, each name-value pair 200 includes a name 210 and an associated value 220. For example, name-value pair 200-1 includes name 210-1 and value 220-1, name-value pair 200-2 includes name 210-2 and value 220-2, name-value pair 200-3 includes name 210-3 and value 220-3, and name-value pair 200-$n$ includes name 210-$n$ and value 220-$n$.

In general, name-value pair 200 can be implemented as a collection of 2-tuples, and is sometimes referred to as a key-value pair, filed-value pair, attribute-value pair, or the like. In some examples name-value pairs 200 can be nested. That is, a value 220 associated with a name 210 can itself include a name-value pair 200 (or multiple name value pairs 200). An example of this is not depicted for clarity.

With some examples, data file 124 can be a Java Script Object Notation (JSON) data file. Said differently, data file 124 can have a data structure and be formatted according to the JSON data format. A simple example JSON data file is given below, where names 210 are strings and values 220 can be any data type. Names 210 and values 220 within a name-value pair 200. Are separated by colons while name-value pairs 200 are separated by comas.
{
"name 1"; value 1,
"name 2"; value 2,
"name 3"; value 3
}
The following example is a JSON data file with nested name-value pairs.
{
"name 1": {
"name 2"; value 2,
"name 3"; value 3
}
}
As can be seen from this example, one of the values (e.g., value associated with name 1) itself includes name-value pairs. It is noted, that these two examples of JSON data files are provided for illustration only in describing the present disclosure and are not representative of all data structures with which data file 124 can be formatted.

Turning to FIG. 3, data file schema 126 includes indications of ones of the name-value pairs 200, which are allowed. Said differently, data file schema 126 provides a list of name-value pairs (e.g., name-value pairs 200 from data file 124, or the like) which are "allowed" in data files. As used herein, the term "allowed" implies that the indicated name-value pairs 200 are permitted to be in the data file. For example, data file schema 126 in FIG. 3 includes an indication of name 210-2 and name 210-3, which indicates that name-value pairs 200 associated with names 210-2 and 210-3 (e.g., name-value pair 200-2 and name-value pair 200-3) are allowed.

In general, data file schema 126 can be implemented as any data structure arranged to list indications of allowed name-value pairs 200. With some examples, data file schema 126 can be a YAML Ain't Markup Language (YAML) data file. Said differently, data file schema 126 can have a data structure and be formatted according to the YAML data format. A simple example YAML data file is given below, where allowed names are indicated.
"name 2"
"name 3"
As can be seen from this example, the data file schema 126 indicates that name-value pairs associated with name 2 and name 3 are allowed.

Furthermore, in some embodiments, data file schema 126 can include an indication of a preferred (or alternatively, mandated) format for the value 220 associated with an allowed name-value pair 200. For example, data file schema 126 in FIG. 3 includes an indication of value format 320-2 associated with name 220-2, which is indicated as allowed. In other embodiments, a second data file schema 126 can be provided to include indications of mandated formats for values of ones of the name-value pairs. That is, a first data file schema 126 can be provided to include indications of allowed name-value pairs while a second, different, data file schema 126 can be provided to include indications of mandated formatting for ones of the name-value pairs.

Returning briefly to FIG. 1, during operation, processor 110 can execute instructions 122 to generate redacted data file 128 based on validating data file 124 using data file schema 126. More particularly, in executing instructions 122, processor 110 can determine whether a name-value pair 200 is indicated as allowed in the data file schema 126 and can remove the name-value pair 200 from the data file 124 based on a determination that the name-value pair is not indicated as allowed by the data file schema 126.

Furthermore, processor in executing instructions 122, processor 110 can validate a format of the name-value pairs 200. More specifically, in executing instructions 122, processor 110 can determine whether a format for a value 220 associated with an allowed name-value pair conforms to a mandated format (e.g., based on data file schema 126, or the like) and can modify the value formatting accordingly.

Processor 110, in executing instructions 122, can generate a redacted data file 128 including indications of the allowed name-value pairs where the formatting of the values corresponds to any mandated formatting. For example, FIG. 4 illustrates redacted data file 128. Redacted data file 128 includes indications of name value pairs 200-2 and 200-3, which correspond to name-value pairs 200 indicates as allowable by the data file schema 126 of FIG. 3. Furthermore, the value 220-2 has been modified based on value format 320-2, resulting in formatted value 420-2 indicated in redacted data file 128.

Figure 5:
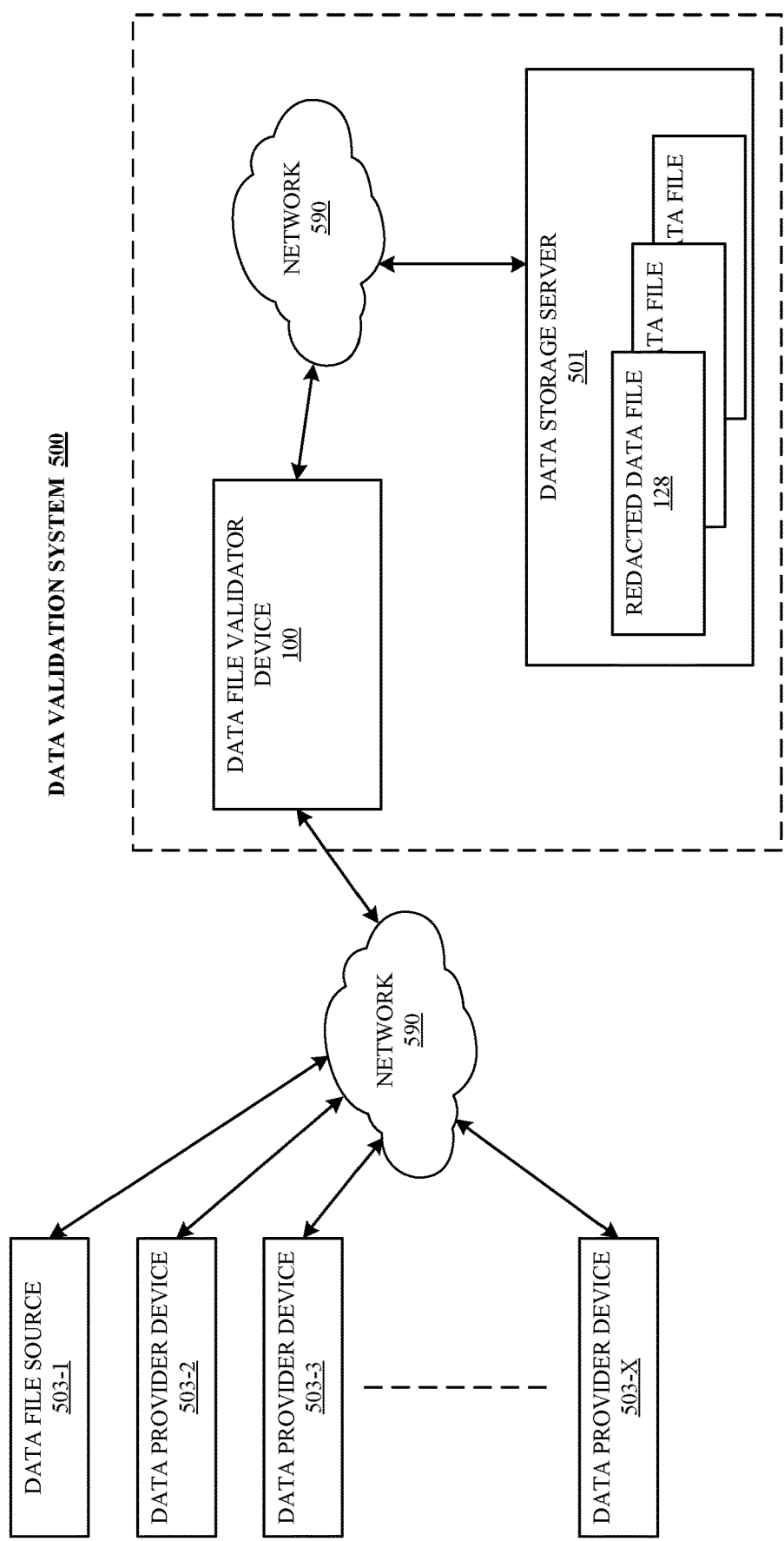
FIG. 5 illustrates a data file validation system.

FIG. 5 illustrates a data file validation system 500. The data file validation system 500 is representative of a system arranged to ingest data files (e.g., possibly from multiple sources) and validate the data files for storage or archival on a data storage device. For example, system 500 is depicted including data file validator device 100 coupled to data storage server 501 via network 590. In some examples, data file validator device 100 and data storage server 501 can be cloud hosted computing and data storage systems and/or services. For example, data storage device 100 can be provided by a computing system hosted by a cloud computing service provider while data storage server 501 can be provided by a data storage system hosted by a cloud computing or cloud storage service provider. The data file validator device 100 and the data storage server 501 can be provided by the same service, or by different services.

Data file validator device 100 is further depicted coupled to data file sources 503 via network 590. Data file validator device 100 can be coupled to any number of data file sources 503, data file source 503-1, data file source 503-2, data file source 503-3, and data file source 503-x are depicted here.

During operation, data file validator 100 can receive data files (e.g., data files 124) from data file sources 503. Data file validator 100 can validate the received data file sources based on a data file schema (e.g., data file schema 126) to generate a redacted data file (e.g., redacted data file 128). Furthermore, data file validator 100 can send redacted data file 128 to data storage server 501 for storage. In general, data validation system 500 can be deployed to validate data files in any of a variety of settings.

The following illustrative example is provided for purposes of clarity of presentation. Data file validation system 500 can be implemented to validate data files generated when data is exchanged between an application programming interface (API) user and an API consumer. Said differently, system 500 can be provided to validate data files ingested by an API. For example, data file sources 503 can correspond to API consumers arranged to receive information from a user (e.g., via online forms, via ingested files, or the like) and to produce data file 124 based on the received information. As a specific example, one of data file sources 503 can be arranged to receive information related to marketing campaigns for a company. As such, a user can provide information related to the marketing campaign and data file source 503 can provide a data file 124 indicating the user provided information. Continuing the example of the marketing campaign, the information may include such details as a description of the market, who is to market the campaign, when the campaign goes live, what is to be marketed, who created the campaign, etc.

Data file validator device 100 can receive this data file 124 from data file source 503 and can validate the data file 124 based on a data file schema 126. In some examples, data file validator device 100 can receive the data file schema 126 from the data file source 503. In other examples, data file validator device 100 may include a single data file schema 126 against which all data files 124 are validated. In still other examples, data file validator device 100 may include (or have access to, such as, via data storage server 501, or the like) multiple data file schemas 126. Data file validator device 100 can validate the received data file 124 based on one of these data file schemas 100.

Figure 6:
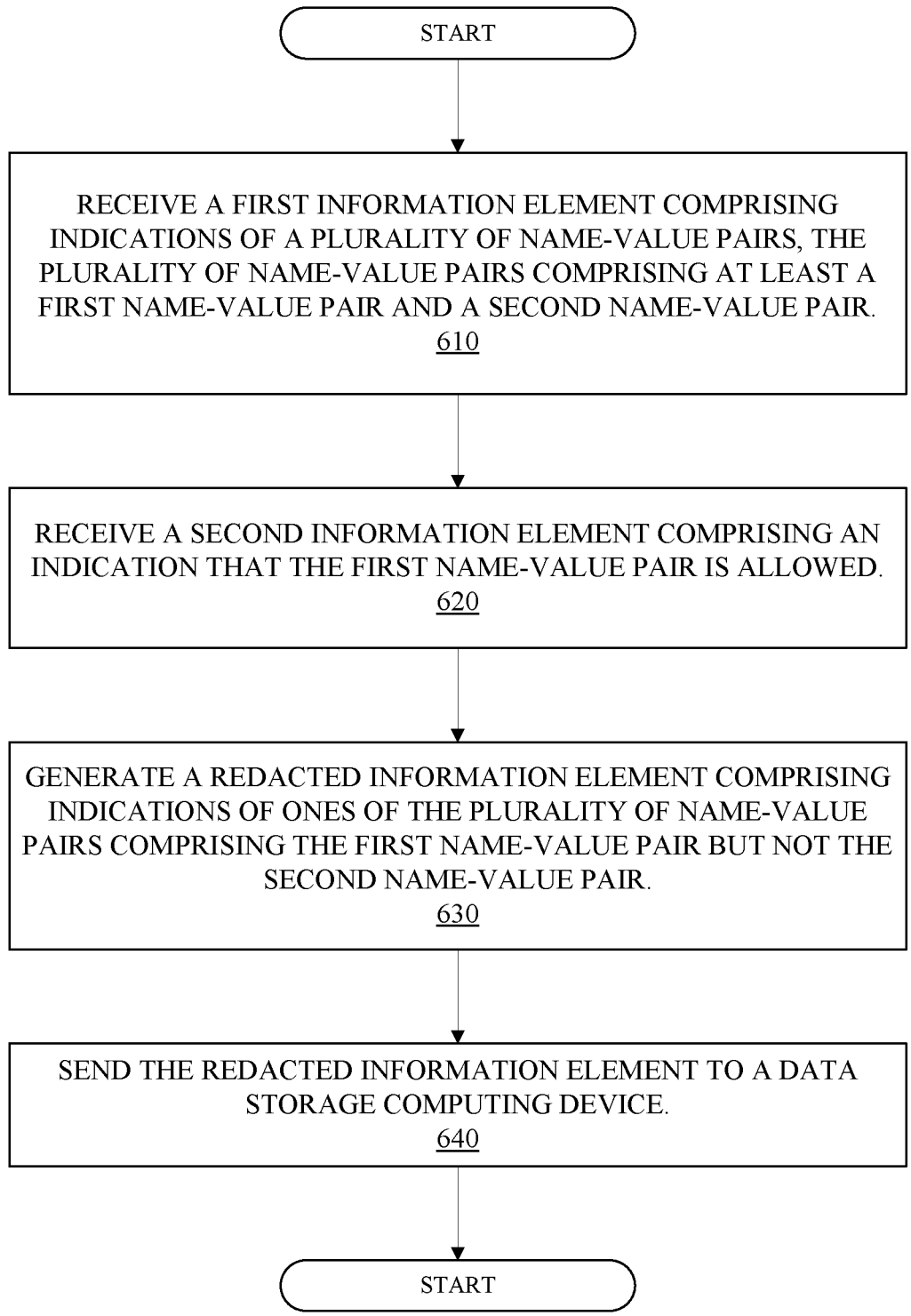
FIG. 6 illustrates a logic flow.

FIG. 6 illustrates a logic flow 600. The logic flow 600 may be representative of some or all the operations executed by one or more embodiments described herein. For example, data file validator device 100 (or components thereof) may perform the operations in logic flow 600 to validate data files as described herein. Logic flow 600 may begin at block 610 "receive a first information element comprising indications of a plurality of name-value pairs, the plurality of name-value pairs comprising at least a first name-value pair and a second name-value pair" where a data file comprising indications of name-value pairs can be received. For example, data file validator device 100 can receive data file 124 (e.g., from data file source 503, or the like). As detailed herein, data file 124 can include indications of name-value pairs 200.

Continuing to block 620 "receive a second information element comprising an indication that the first name-value pair is allowed" where a data file schema can be received. For example, data file validator device 100 can receive data file schema 126 (e.g., from data file source 503, from data storage server 501, from memory internal to device 100, from memory coupled to device 100, or the like). As detailed herein, data file schema 126 includes indications of allowed name-value pairs 200.

Continuing to block 630 "generate a redacted information element comprising indications of ones of the plurality of name-value pairs comprising the first name-value pair but not the second name-value pair" a redacted data file can be generated. For example, data validator device 100 can determine ones of the name-value pairs 200 from data file 124 indicated as allowed by data file schema 126 and can generate redacted data file 128 to include indications of the allowed name-value pairs 200.

Continuing to block 640 "send the redacted information element to a data storage computing device" redacted data file can be sent to a data storage device. For example, data file validator device 100 can send redacted data file 128 to data storage device 501.

Figure 7:
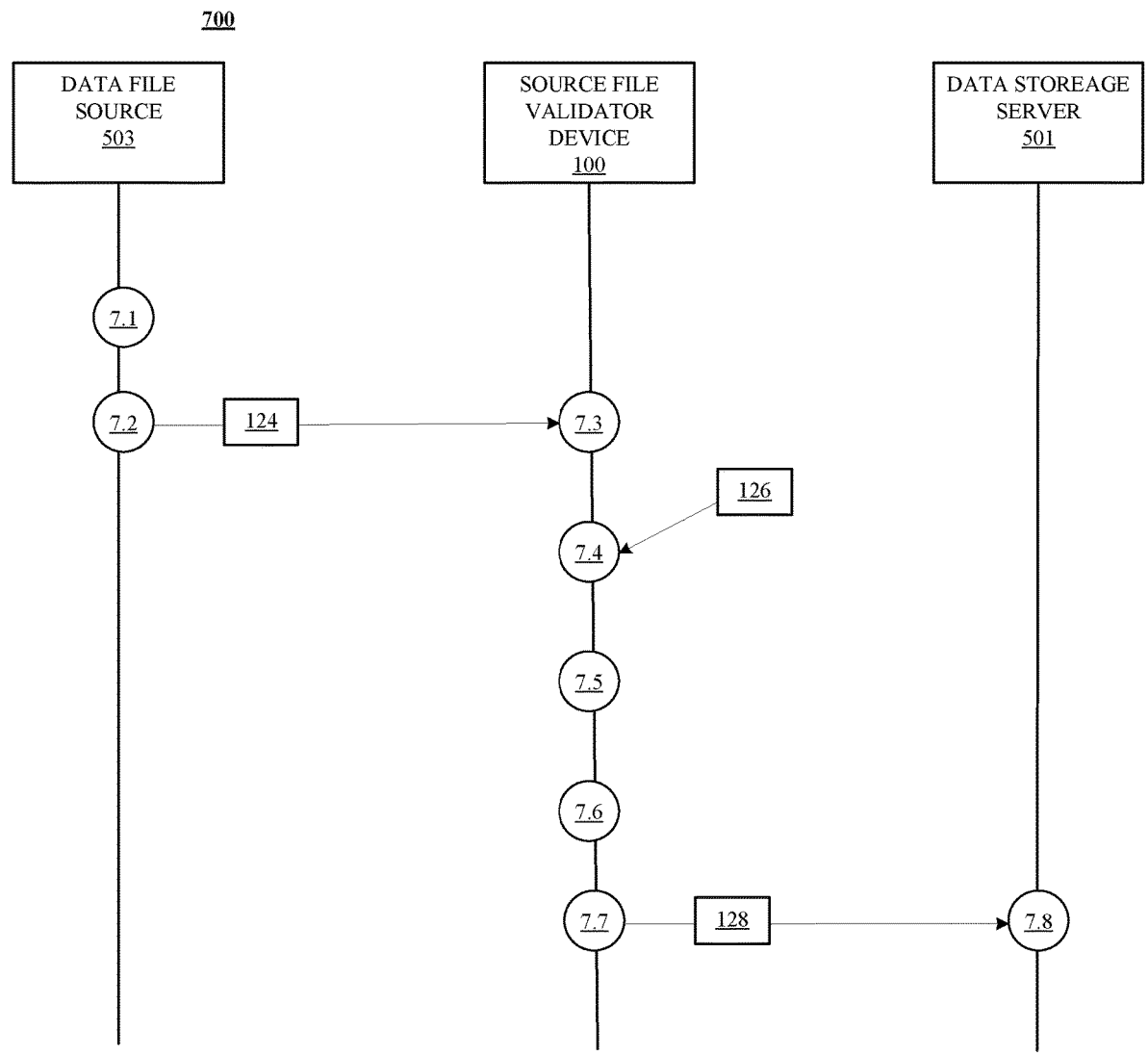
FIG. 7 illustrates a technique.

FIG. 7 illustrates technique 700, which can be representative of operations performed in operation of data processing system 500. Technique 700 is described with reference to the system 500 of FIG. 5. Technique 700 can begin at circles 7.1. At circles 7.1, data file source 503 can ingest information. For example, data file source 503 can receive information via an API. Further at circle 7.1, data file source 503 can generate data file 124 comprising indications of the received information as name-value pairs 200.

Continuing to circle 7.2 and circle 7.3. At circle 7.2, data file source 503 can send data file 124 to data file validator device 100, while at circle 7.3, data file validator device 100 can receive data file 124 from data file source 503. For example, processor 110, in executing instructions 122 can receive data file 124 (e.g., via interconnect 130, or the like).

Continuing to circle 7.4, data file validator device 100 can access a data file schema 126. In some examples, processor 100, in executing instructions 122 can receive data file schema 126 from data file source 503. In other examples, in executing instructions 122, processor 110 can receive data file schema 126 from data storage device 501.

Continuing to circle 7.5, data file validator device 100 can identify ones of the name-value pairs 200 in data file 124 that are allowed based on data file schema 126. Continuing to circle 7.6, data file validator 100 can generate redacted data file 128 to include indications of the name-value pairs 200 identified as allowed at circle 7.5.

Continuing to circle 7.7 and circle 7.8. At circle 7.7, data file validator device 100 can send redacted data file 128 to data storage device 501, while at circle 7.8, data storage device 501 can receive redacted data file 128.

Figure 8:
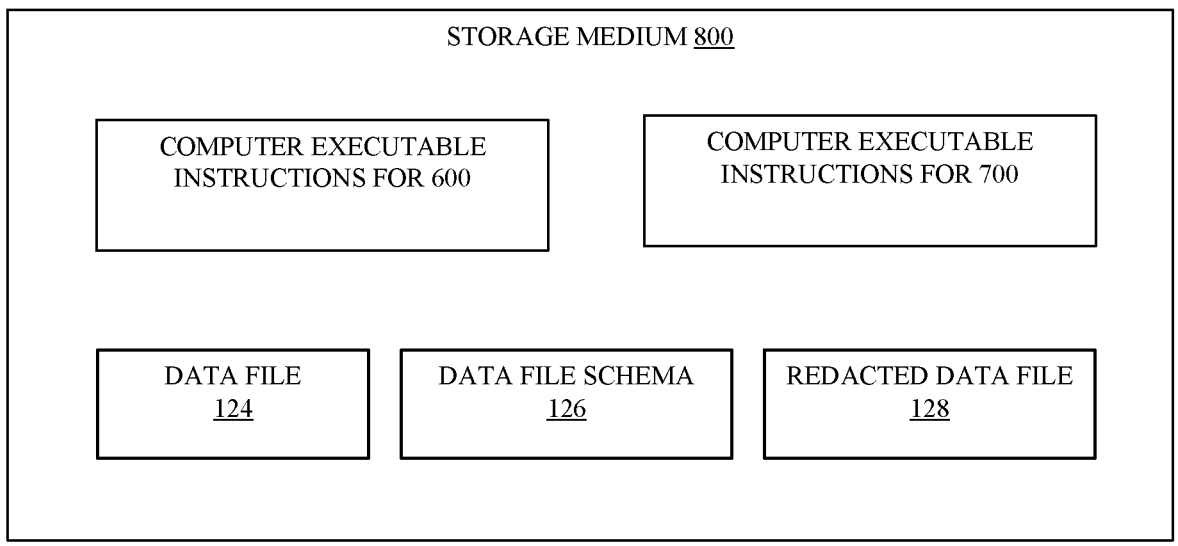
FIG. 8 illustrates a storage medium.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or more of techniques, logic flows, or operations described herein, such as with respect to logic flow 600 and/or technique 700 of FIGS. 6 and 7, respectively. The storage medium 800 may further store data structures for the data file 124, data file schema 126, and/or redacted data file 128. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
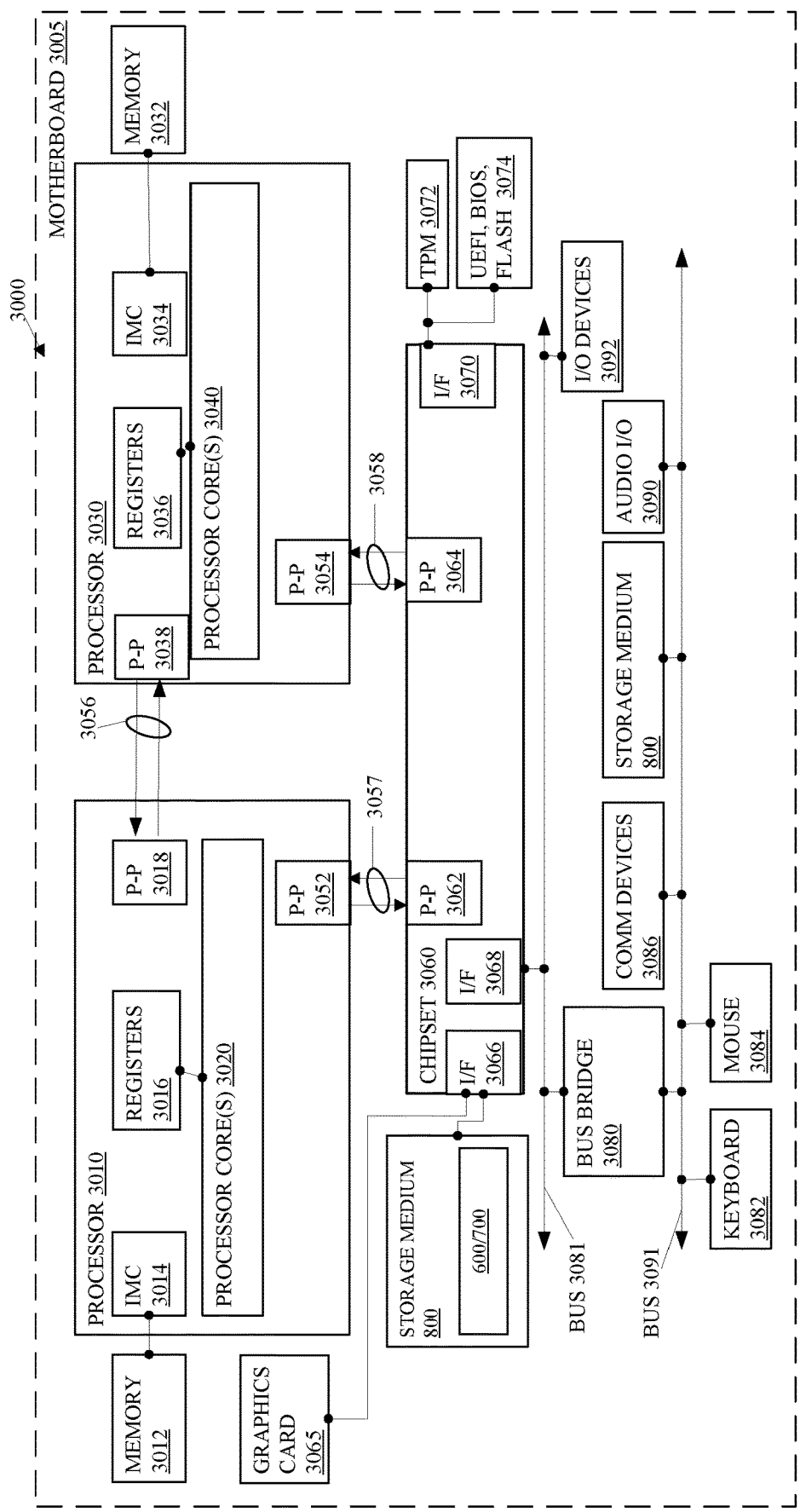
FIG. 9 illustrates a computing system.

FIG. 9 illustrates an embodiment of a system 3000. The system 3000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 3000 may have a single processor with one core or more than one processor. Note that the term "processor" refers to a processor with a single core or a processor package with multiple processor cores. In at least one embodiment, the computing system 3000 is representative of the source processing device 200. More generally, the computing system 3000 is configured to implement all logic, systems, logic flows, methods, apparatuses, and functionality described herein with reference to FIGS. 1-8.

Any functionality described in this application is intended to refer to a structure (e.g., circuitry, or the like) of a computer-related entity arranged to implement the described functionality. Structural examples of such a computer-related entity are provided by the exemplary system 3000. For example, such structure can be, but is not limited to, a processor, a processor executing a process, a hard disk drive, multiple storage drives (of optical and/or magnetic storage medium), a thread of execution, a program, and/or a computer. Further, the structure(s) may be communicatively coupled to each other by various types of communications media to coordinate operations. The coordination may involve the uni-directional or bi-directional exchange of information. For instance, the structure may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 3000 comprises a motherboard 3005 for mounting platform components. The motherboard 3005 is a point-to-point interconnect platform that includes a first processor 3010 and a second processor 3030 coupled via a point-to-point interconnect 3056 such as an Ultra Path Interconnect (UPI). In other embodiments, the system 3000 may be of another bus architecture, such as a multi-drop bus. Furthermore, each of processors 3010 and 3030 may be processor packages with multiple processor cores including processor core(s) 3020 and 3040, respectively. While the system 3000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 3010 and the chipset 3060. Some platforms may include additional components and some platforms may only include sockets to mount the processors and/or the chipset.

The processors 3010, 3020 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multiprocessor architectures may also be employed as the processors 3010, 3020.

The first processor 3010 includes an integrated memory controller (IMC) 3014 and point-to-point (P-P) interfaces 3018 and 3052. Similarly, the second processor 3030 includes an IMC 3034 and P-P interfaces 3038 and 3054. The IMC's 3014 and 3034 couple the processors 3010 and 3030, respectively, to respective memories, a memory 3012 and a memory 3032. The memories 3012 and 3032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 3012 and 3032 locally attach to the respective processors 3010 and 3030. In other embodiments, the main memory may couple with the processors via a bus and shared memory hub.

The processors 3010 and 3030 comprise caches coupled with each of the processor core(s) 3020 and 3040, respectively. In the present embodiment, the processor core(s) 3020 of the processor 3010 and the processor core(s) 3040 of processor 3030 include the neural network logic 101, convolution algorithm logic 102, non-zero weight recovery logic 103, and weight value from weight ID logic 104. The processor cores 3020, 3040 may further include memory management logic circuitry (not pictured) which may represent circuitry configured to implement the functionality of technique 400, logic flow 600, logic flow 700, and/or data processing model 226 in the processor core(s) 3020, 3040, or may represent a combination of the circuitry within a processor and a medium to store all or part of data processing model 226 in memory such as cache, the memory 3012, buffers, registers, and/or the like. The functionality of technique 400, logic flow 600, logic flow 700, and/or data processing model 226 may reside in whole or in part as code in a memory such as the storage medium 800 attached to the processors 3010 and/or 3030 via a chipset 3060. The functionality of technique 400, logic flow 600, logic flow 700, and/or data processing model 226 may also reside in whole or in part in memory such as the memory 3012 and/or a cache of the processor. Furthermore, the functionality of technique 400, logic flow 600, logic flow 700, and/or data processing model 226 may also reside in whole or in part as circuitry within the processor 3010 and may perform operations, e.g., within registers or buffers such as the registers 3016 within the processors 3010, 3030, or within an instruction pipeline of the processors 3010, 3030. Further still, the functionality of technique 400, logic flow 600, logic flow 700, and/or data processing model 226 may be integrated a processor of the hardware accelerator for performing inference using a DNN.

As stated, more than one of the processors 3010 and 3030 may comprise the functionality of technique 400, logic flow 600, logic flow 700, and/or data processing model 226, such as the processor 3030 and/or a processor within the hardware accelerator 106 coupled with the chipset 3060 via an interface (I/F) 3066. The I/F 3066 may be, for example, a Peripheral Component Interconnect-enhanced (PCI-e).

The first processor 3010 couples to a chipset 3060 via P-P interconnects 3052 and 3062 and the second processor 3030 couples to a chipset 3060 via P-P interconnects 3054 and 3064. Direct Media Interfaces (DMIs) 3057 and 3058 may couple the P-P interconnects 3052 and 3062 and the P-P interconnects 3054 and 3064, respectively. The DMI may be a high-speed interconnect that facilitates, e.g., eight Giga Transfers per second (GT/s) such as DMI 3.0. In other embodiments, the processors 3010 and 3030 may interconnect via a bus.

The chipset 3060 may comprise a controller hub such as a platform controller hub (PCH). The chipset 3060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 3060 may comprise more than one controller hub such as a chipset with a memory controller hub, a graphics controller hub, and an input/output (I/O) controller hub.

In the present embodiment, the chipset 3060 couples with a trusted platform module (TPM) 3072 and the UEFI, BIOS, Flash component 3074 via an interface (I/F) 3070. The TPM 3072 is a dedicated microcontroller designed to secure hardware by integrating cryptographic keys into devices. The UEFI, BIOS, Flash component 3074 may provide pre-boot code.

Furthermore, chipset 3060 includes an I/F 3066 to couple chipset 3060 with a high-performance graphics engine, graphics card 3065. In other embodiments, the system 3000 may include a flexible display interface (FDI) between the processors 3010 and 3030 and the chipset 3060. The FDI interconnects a graphics processor core in a processor with the chipset 3060.

Various I/O devices 3092 couple to the bus 3081, along with a bus bridge 3080 which couples the bus 3081 to a second bus 3091 and an I/F 3068 that connects the bus 3081 with the chipset 3060. In one embodiment, the second bus 3091 may be a low pin count (LPC) bus. Various devices may couple to the second bus 3091 including, for example, a keyboard 3082, a mouse 3084, communication devices 3086 and the storage medium 700 that may store computer executable code as previously described herein. Furthermore, an audio I/O 3090 may couple to second bus 3091. Many of the I/O devices 3092, communication devices 3086, and the storage medium 800 may reside on the motherboard 3005 while the keyboard 3082 and the mouse 3084 may be add-on peripherals. In other embodiments, some or all the I/O devices 3092, communication devices 3086, and the storage medium 800 are add-on peripherals and do not reside on the motherboard 3005.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits.

Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The following examples pertain to further embodiments, from which numerous permutations and configurations will be apparent.

What is claimed is:

1. An apparatus for arranging information related to marketing campaigns for a company, comprising:
   network interconnect circuitry to connect to a network;
   a processor coupled to the network interconnect circuitry; and memory coupled to the processor, the memory comprising instructions that when executed by the processor cause the processor to:
   receive, via the network interconnect circuitry, a first information element comprising indications of a plurality of name-value pairs, the plurality of name value pairs comprising at least a first name-value pair and a second name-value pair;

receive, via the network interconnect circuitry, a second information element comprising an indication that the first name-value pair is allowed;

generate a redacted information element comprising indications of ones of the plurality of name-value pairs comprising the first name-value pair but not the second name-value pair;

receive, via the network interconnect circuitry, a schema associated with the plurality of name-value pairs comprising a third name-value pair, wherein the second information element comprises an indication that the third name-value pair is allowed and wherein the redacted information element comprises indications of the third-name value pair;

validate the first name-value pair based in part on the schema; and send, via the network interconnect circuitry, the redacted information element to a data storage computing device.

2. The apparatus of claim 1, wherein the schema comprises indications of at least a format for the first name-value pair, a format for the second name value pair, and a format for the third name-value pair.

3. The apparatus of claim 1, wherein sending, via the network interconnect circuitry, the redacted information element to the data storage computing device comprises adding indications of the at least one name-value pair of the plurality of name-value pairs in the redacted information element to a database.

4. At least one machine-readable storage medium, for arranging information related to marketing campaigns for a company, comprising instructions that when executed by a processor at a computing platform, cause the processor to:

receive a first information element comprising indications of a plurality of name-value pairs, the plurality of name value pairs comprising at least a first name-value pair and a second name-value pair;

receive a second information element comprising an indication that the first name-value pair is allowed;

generate a redacted information element comprising indications of ones of the plurality of name-value pairs comprising the first name-value pair but not the second name-value pair;

receive a schema associated with the plurality of name-value pairs comprising a third name-value pair, wherein the second information element comprises an indication that the third name-value pair is allowed and wherein the redacted information element comprises indications of the third-name value pair;

validate the first information element based in part on the schema; and send the redacted information element to a data storage computing device.

5. The at least one machine-readable storage medium of claim 4, wherein the schema comprises indications of at least a format for the first name-value pair, a format for the second name value pair, and a format for the third name-value pair.

6. The at least one machine-readable storage medium of claim 4, wherein sending, via an interconnect, the redacted information element to the data storage computing device comprises adding indications of the at least one name-value pair of the plurality of name-value pairs in the redacted information element to a database.

7. A computer-implemented method for arranging information related to marketing campaigns for a company, comprising:

receiving, via an interconnect at a computer, a first information element comprising indications of a plurality of name-value pairs, the plurality of name-value pairs comprising at least a first name-value pair and a second name-value pair;

receiving, via the interconnect, a second information element comprising an indication that the first name-value pair is allowed;

generating a redacted information element comprising indications of ones of the plurality of name-value pairs comprising the first name-value pair but not the second name-value pair;

receiving, via the interconnect a schema associated with the plurality of name-value pairs comprising a third name-value pair, wherein the second information element comprises an indication that the third name-value pair is allowed and wherein the redacted information element comprises indications of the third-name value pair;

validating the first information element based in part on the schema; and sending, via the interconnect, the redacted information element to a data storage computing device.

8. The computer-implemented method of claim 7, wherein the schema comprises indications of at least a format for the first name-value pair, a format for the second name value pair, and a format for the third name-value pair.

9. The computer-implemented method of claim 7, wherein sending, via the interconnect, the redacted information element to the data storage computing device comprises adding indications of the at least one name-value pair of the plurality of name-value pairs in the redacted information element to a database.

* * * * *